March 1, 1966     U. RIEGGER     3,237,628

METHOD OF PRODUCING CIGAR FILLERS

Filed July 27, 1964     6 Sheets-Sheet 1

INVENTOR
ULRICH RIEGGER
BY Singer Stern & Carlberg
ATTORNEYS

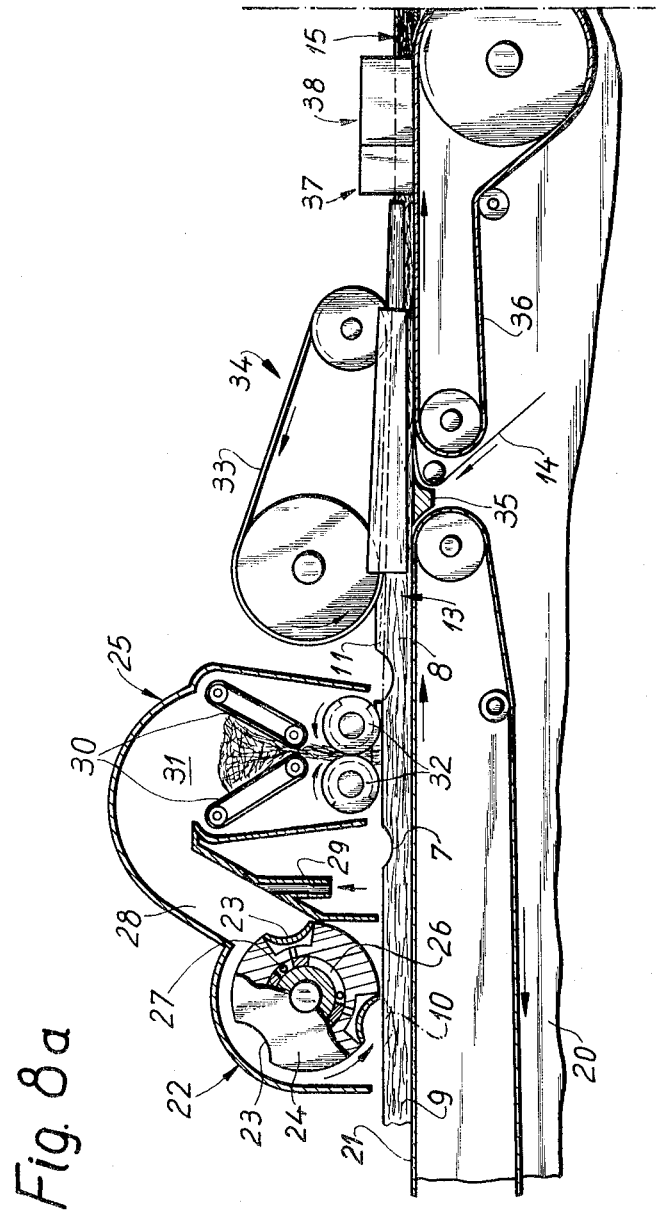

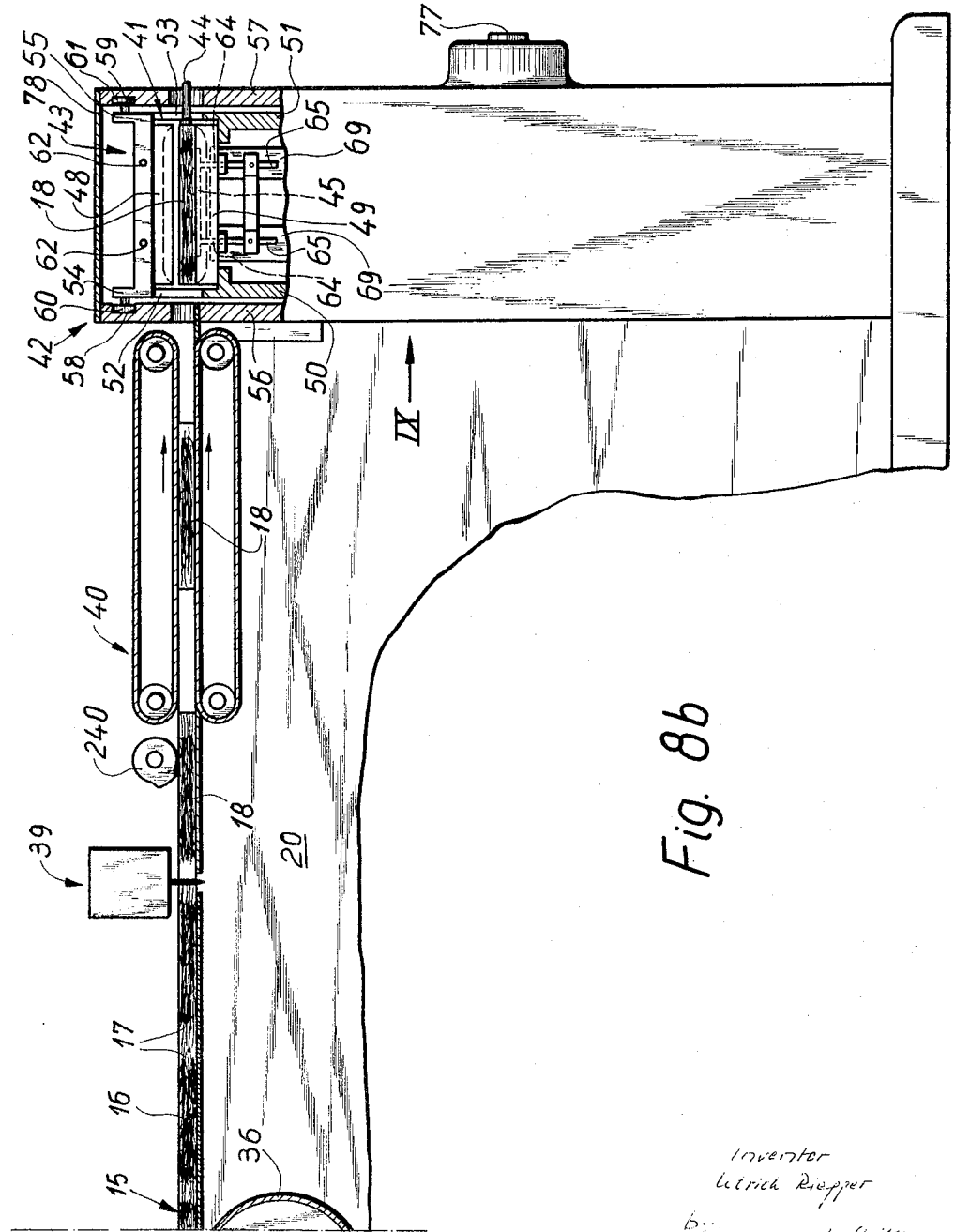

March 1, 1966 U. RIEGGER 3,237,628
METHOD OF PRODUCING CIGAR FILLERS
Filed July 27, 1964 6 Sheets-Sheet 4
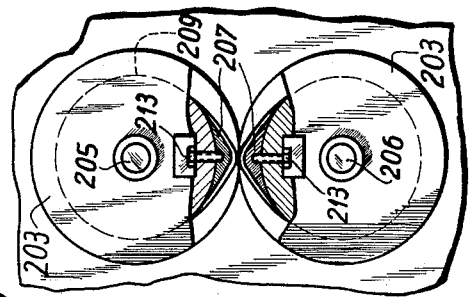
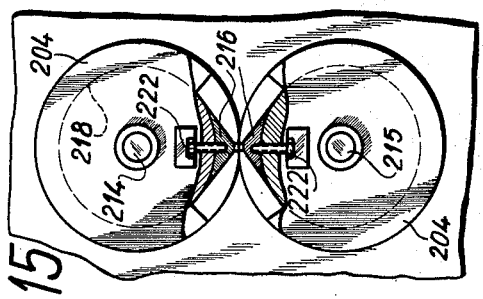
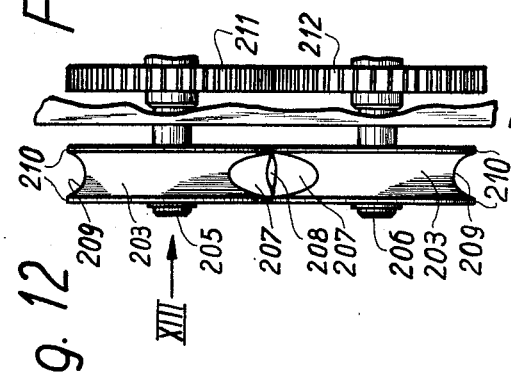
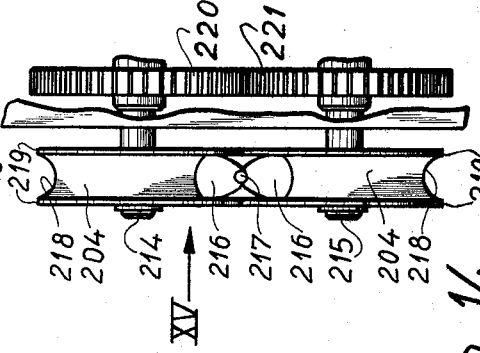
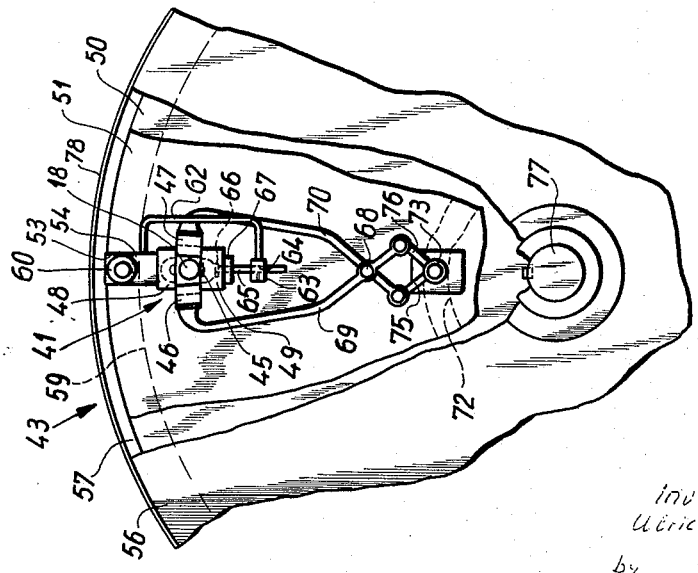
Inventor
Ulrich Riegger
by
Michael J. Striker March 1, 1966  U. RIEGGER  3,237,628
METHOD OF PRODUCING CIGAR FILLERS
Filed July 27, 1964  6 Sheets-Sheet 5
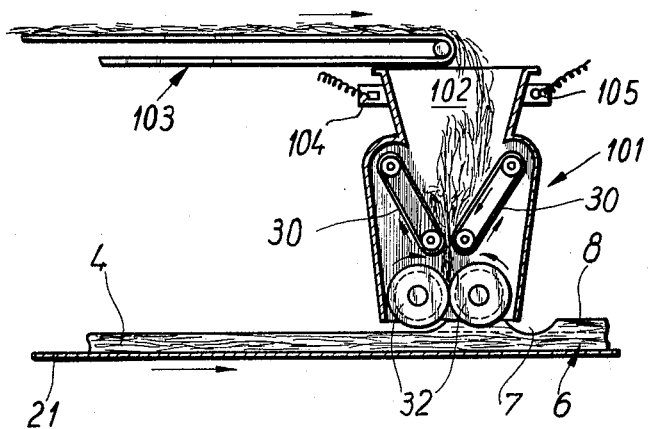
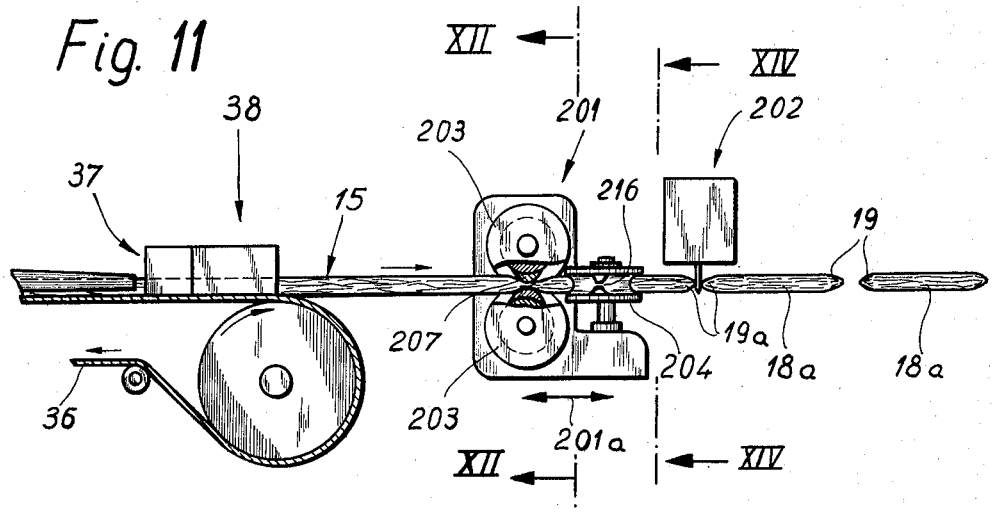

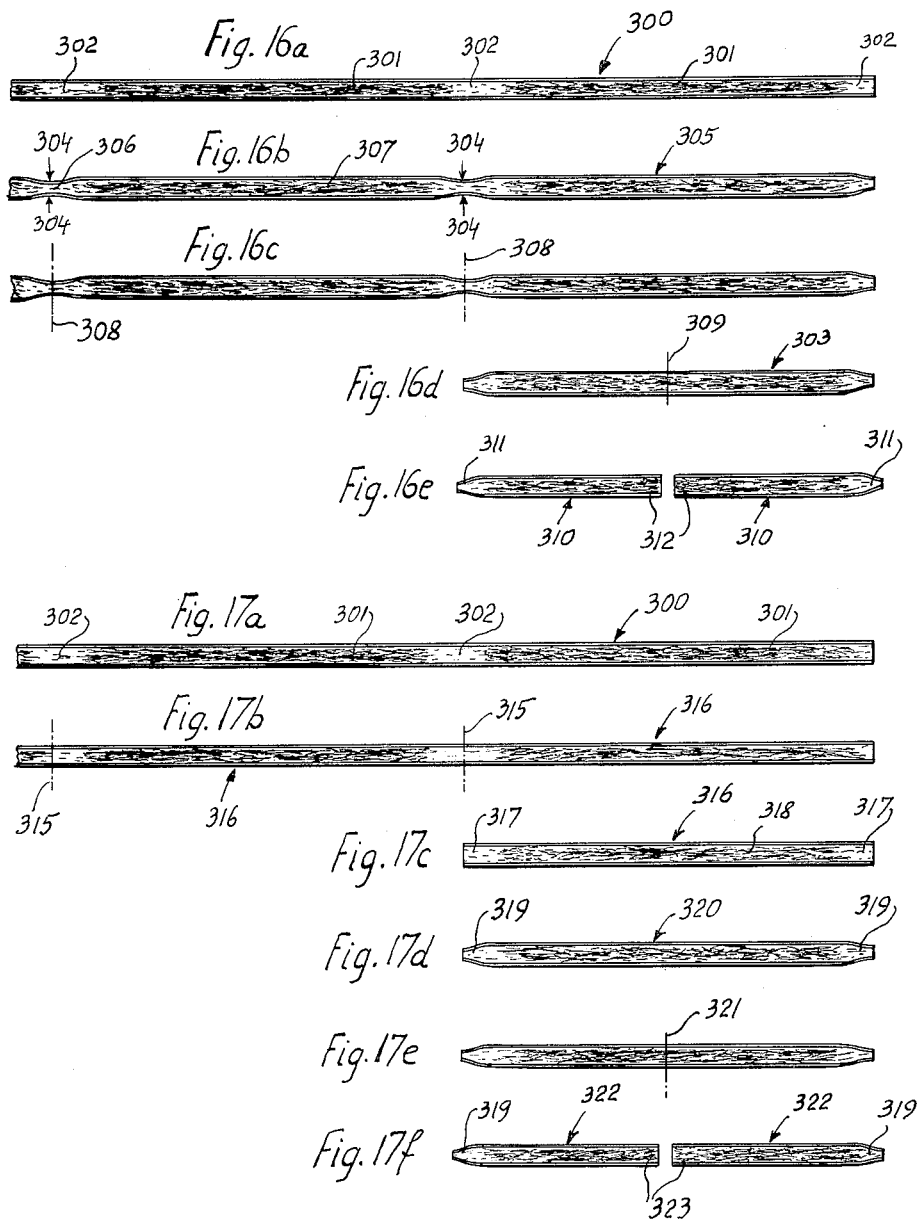

United States Patent Office 3,237,628
Patented Mar. 1, 1966

3,237,628
METHOD OF PRODUCING CIGAR FILLERS
Ulrich Riegger, Wentorf, Bezirk Hamburg, Germany, assignor to Hauni-Werke Körber & Co., K.G., Hamburg-Bergedorf, Germany
Filed July 27, 1964, Ser. No. 386,116
Claims priority, application Germany, Dec. 4, 1959, H 38,063
19 Claims. (Cl. 131—20)

This is a continuation-in-part of my application Serial No. 73,371, filed December 2, 1960 and now abandoned.

The present invention relates to a method of producing cigar fillers, and more particularly to a method of producing cigar fillers with tapered or constricted end portions.

In the manufacture of cigar fillers by conventional methods, a continuous cigar filler string is severed transversely at longitudinally spaced points to yield fillers of requisite length. Such fillers may be of circular, oval or polygonal cross-sectional outline and their thickness is the same from end to end. In order to form cigar fillers with one or two tapered or constricted end portions, the manufacturers of cigars presently resort to a well known method which is practiced in cigar filler machines of conventional design. Such conventional machines produce cigar fillers singly or in pairs, and operate at speeds not exceeding 25 revolutions per minute.

Accordingly, it is an important object of my invention to provide a novel method of producing cigar fillers with tapered or constricted end portions at a rate exceeding many times (for example, at least ten times) the rate of which such fillers may be produced by conventional methods without, however, affecting the quality of the ultimate product.

Another object of the invention is to provide a method of producing cigar fillers with one of two tapered or constricted end portions from a continuous string of cigar filler material.

A further object of the invention is to provide a method of the above outlined characteristics according to which each of a series of mass-produced cigar fillers will be of constant or nearly constant density along the full length thereof and according to which each cigar filler receives an exactly predetermined shape so that such fillers may be wrapped to form high-quality cigars of identical dimensions.

With the above objects in view, one feature of the present invention resides in the provision of a method of producing cigar fillers of unit length or double unit length with constricted end portions. The method comprises the steps of forming a cigar filler string having first portions of greater density which alternate with second portions of lesser density, convoluting a wrapper around the string to form a wrapped cigar filler string and thereupon, in any desired sequence, compressing the second portions (preferably to substantially the same density as that of the first portions) and severing the wrapped string across the second portions. Thus, the wrapped string may be severed before the second portions are compressed or vice versa.

In making the cigar filler string, one may form a tobacco stream of constant cross-sectional area and density but containing less tobacco than required in the string. In a next step, tobacco is added to longitudinally spaced portions of the stream and the thus modified stream is then compressed to form a string of constant or nearly constant cross-sectional area wherein portions of greater density alternate with portions of lesser density. This string is then wrapped to form a wrapped cigar filler string.

Alternatively, one may form a tobacco stream of constant cross-sectional area and density which contains just as much tobacco as is needed in the string. In the next step, one removes predetermined quantities of tobacco from longitudinally spaced portions of the stream, and such predetermined quantities of tobacco are added evenly to the remaining portions of the stream. The thus modified stream is then compressed to form a cigar filler string of constant cross-sectional area but of varying density. In the next step, the string is wrapped and is severed and compressed to yield fillers with tapered or constricted end portions of unit length or double unit length.

The novel features which are considered as characteristic of the invention are set forth in particular in the appended claims. The improved method itself, however, will be best understood upon perusal of the following detailed description of certain specific embodiments of various cigar filler making apparatus with simultaneous reference to the accompanying drawings, in which:

FIGS. 8a and 8b show in side elevation a cigar filler making apparatus which may be utilized for practicing the method of FIG. 4 and which comprises a series of molds of the type shown in FIG. 7, certain parts of the apparatus being shown in section;

FIG. 9 is a fragmentary end elevational view of a detail of the apparatus as seen in the direction of the arrow IX in FIG. 8b;

FIG. 10 illustrates a tobacco admitting device adapted to be used in a cigar filler making apparatus which is utilized for practicing the method of FIG. 3;

FIG. 11 is a fragmentary side elevational view of another cigar filler making apparatus wherein the string is first compressed or molded at regular intervals and is thereupon severed to yield finished fillers with two tapered or constricted end portions;

FIG. 12 is an end elevational view of two precompressing rolls substantially as seen in the direction of arrows from the line XII—XII of FIG. 11;

FIG. 13 is a front elevational view substantially as seen in the direction of arrow XIII in FIG. 12;

FIG. 14 is an end elevational view of a second pair of compressing rolls substantially as seen in the direction of arrows from the line XIV of FIG. 11;

FIG. 15 is a front elevational view as seen in the direction of arrow XV in FIG. 14;

FIGS. 16a to 16e illustrate the steps of a method for the production of cigar fillers of unit length each of which comprises an end portion of constant cross section; and FIGS. 17a–17f, illustrate the steps of a method which constitutes a modification of the method shown in FIGS. 16a–16e.

In the following detailed description of the drawings, FIGS. 8a and 8b will be referred to as FIG. 8.

Figure 1:
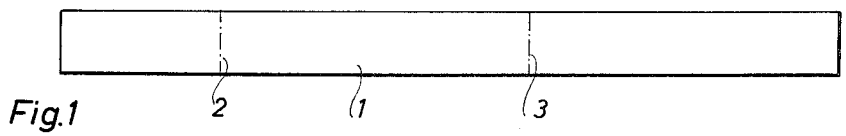
FIG. 1 is a side elevational view of a customary cigar filler string which may be severed to yield fillers of constant cross-sectional area from end to end.

Referring first to FIG. 1, there is shown a cigar filler string 1 of conventional form which may be severed along lines 2 and 3 to yield cigar fillers of desired length. The density and the cross-sectional area of the string 1 are constant from the one to the other end thereof.

Figure 2:
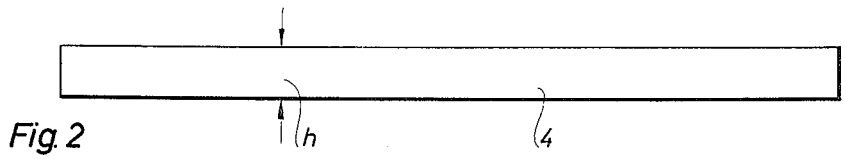
FIG. 2 is a side elevational view of a tobacco stream which contains less tobacco than is necessary in a cigar filler string.
Figure 3:
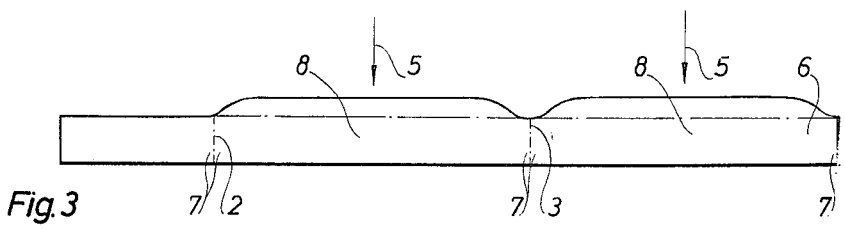
FIG. 3 is a side elevational view of a modified tobacco stream which has been built up by adding tobacco to the stream of FIG. 2 in accordance with a first embodiment of my method.

FIG. 2 illustrates a tobacco stream 4 which is of constant height $h$ and has the same density in all zones thereof. This stream is processed in accordance with a first embodiment of my method to form a wrapped cigar filler string wherein portions of greater density alternate with portions of lesser density. As shown in FIG. 3, measured quantities of tobacco (see the arrows 5) are added to selected portions of the stream 4 to form a modified tobacco stream wherein portions 8 which contain more tobacco alternate with portions 7 which contain less tobacco. The thus modified tobacco stream is thereupon compressed to form a cigar filler string 6 of constant cross-sectional area whereby the density of portions 8 exceeds the density of portions 7. In the next step, the string 6 is wrapped into a strip of tape to form a wrapped cigar filler string of constant cross-sectional area but with portions of greater density alternating with portions of lesser density. The wrapped cigar filler string is then severed along lines 2 and 3 to yield partially finished fillers of requisite length whereby the end portions of such partially finished fillers contain less tobacco than the remainder thereof. Consequently, the partially finished fillers may be compressed at their ends to develop tapered or constricted end portions or tips whereby the compressing step is normally carried out in such a way that the density of the tapered ends equals or approximates the density of the remaining (median) portion of the respective filler. The manner in which tobacco may be added to the stream 4 of FIG. 2 will be described in connection with FIG. 10.

It will be noted that the method which is illustrated in FIGS. 2 and 3 contemplates forming a tobacco stream of constant cross-sectional area and constant density, adding tobacco along selected portions of the stream to form a stream wherein portions containing more tobacco alternate with portions containing less tobacco, compressing the thus obtained stream to form a cigar filler string wherein portions of greater density alternate with portions of lesser density, wrapping the string, severing the wrapped string across such portions whose density is less than the density of portions which contain more tobacco, and thereupon compressing the end portions of the resulting fillers to a density which at least approximates the density of the remainder of the corresponding filler.

It will be understood that the distance between the lines 2 and 3 may equal the distance between the ends of a cigar filler of double unit length. Such filler may be severed midway between its ends to yield two shorter fillers each of which comprises a single tapered or constricted end portion and a second end portion of constant cross section. The methods of producing fillers of unit length having a tapered or constricted end portion and an end portion of constant cross section will be described in connection with FIGS. 16a–16e and 17a–17f.

Figure 4:
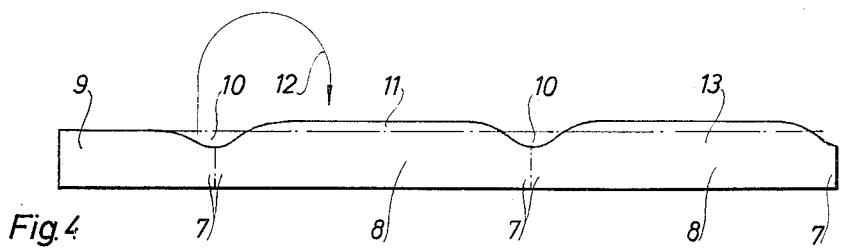
FIG. 4 is a side elevational view of another tobacco stream which is obtained in accordance with another embodiment of my method.

FIG. 4 illustrates another method of producing cigar fillers with tapered end portions. In the first step, one provides a tobacco stream 9 which is of constant cross-sectional area and of constant density all the way from one to the other end. In the next step, measured quantities of tobacco are removed from longitudinally spaced zones 10 of the stream 9, and the thus removed tobacco is added at 11 to the remaining zones of the stream 9 (see the arrow 12) so that, here again, portions containing more tobacco alternate with portions which contain less tobacco. The stream is then compressed to form a cigar filler string 13 of constant cross-sectional area whereby the resulting string comprises portions 8 of greater density which alternate with portions 7 of lesser density. This string 13 is then wrapped in a continuous length of tape to form a wrapped cigar filler string and is severed across the portions 7 to yield fillers of unit length or double unit length, depending on the length of portions 8. In the next-following step, the fillers are compressed at their ends to develop tips which taper in a direction from the center toward the respective end of the filler whereby the density of such tips may but need not be exactly the same as the density of the remainder of the filler.

It will be seen that the method which was described in connection with FIG. 4 comprises forming a tobacco stream 9 which contains just as much tobacco as the cigar filler string which is to be obtained from the stream 9. On the other hand, the method of FIGS. 2 and 3 comprises forming a tobacco stream 4 which contains less tobacco than is necessary in the cigar filler string so that it is necessary to admit into the path of the stream 4 additional tobacco along such portions of the stream 4 which are to form the median portions of cigar fillers. FIGS. 3 and 4 further show that tobacco may be added in such a way that the ends of added tobacco batches form a smooth transition from zones containing a maximum of tobacco to zones 7 which contain a minimum of tobacco so that, on compression of the ends of the fillers, the density of the tips will be constant despite the fact that the tips taper toward the adjacent end faces of the fillers.

Figure 5:
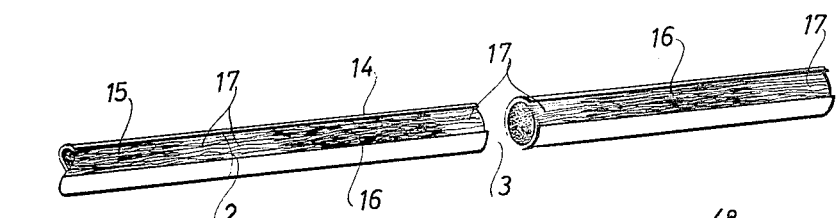
FIG. 5 is a perspective view of a completed cigar filler string which is obtained from the stream shown in FIG. 3 or 4, a portion of the wrapper being broken away and a length of the string being cut away to form a partially finished filler.

FIG. 5 illustrates a wrapper 14 which is applied around the cigar filler string 13 of FIG. 4 to form therewith a continuous wrapped cigar filler string 15. The wrapped string 15 has been severed at 3 so that its foremost end portion forms a filler of constant cross-sectional area but having end zones 17 of lesser density alternating with a median zone 16 of greater density. The remainder of the wrapped string 15 also comprises zones 17 of lesser density which alternate with zones 16 of greater density so that, when the wrapped string is severed along the line 2, it yields another filler which may be transformed into a filler with tapered or constricted end portions.

Figures 6, 7:
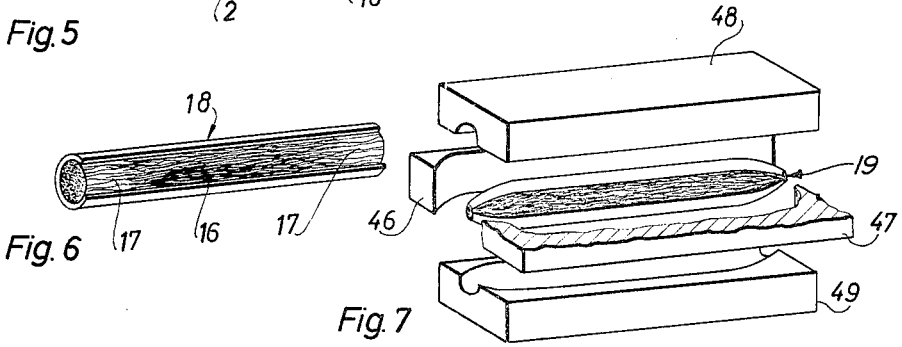
FIG. 6 is a perspective view of a partially finished filler corresponding to the one shown in FIG. 5.
FIG. 7 is a perspective view of a finished filler with two tapered or constricted end portions and further showing the sections of a mold which is utilized for shaping the filler of FIG. 6.

FIG. 6 shows a cigar filler 18 which is obtained by severing the wrapped cigar filler string 15 of FIG. 5. The filler 18 is ready to be shaped in a mold of the type shown diagrammatically in FIG. 7 whereby the zones 17 form end portions or tips 19 which taper gradually in directions toward the adjacent end portions of the resulting product. The mold of FIG. 7 comprises two pairs of sections including an inner section 48, an outer section 49 and two lateral sections 46, 47. The sections 46, 47 and 48, 49 may be moved toward each other to define two mold cavities each of which is large enough to accommodate the filler 18 and to simultaneously deform the end portions of the filler so that, on movement of the sections 48, 49 away from each other, the end portions are provided with tapers, as shown at 19, and their density approximates the density of the remainder of the finished filler. As stated above, the filler 18 may be of double unit length and may be severed to yield two shorter fillers prior to or after the molding step. If the filler 18 is of double unit length, it will yield two shorter fillers each of which will have a single tapered or constricted end portion.

It will be readily understood that the method of my invention may be modified by compressing the wrapped cigar filler string 15 prior to the severing step whereby the string will develop portions of larger cross-sectional area (obtained from the zones 16) which alternate with portions of smaller cross-sectional area (obtained upon compression of the zones 17) and the thus deformed string will be severed midway across the portions of reduced cross-sectional area. In other words, the cutting or severing step may but need not precede the compressing step.

A very important advantage of cigars which are provided with one or two tapered or constricted end portions and are of uniform density from the one or the other end is that such cigars are sought by many cigar smokers who prefer to draw smoke through a tapered end portion and/or to light a tapered end portion. Furthermore, the "pull" of a cigar which has one or two tapered end portions and whose density is constant from end to end is more satisfactory than the "pull" of a cigar which is provided with denser ends. Also, many smokers consider a cigar with tapered end portions as a more expensive product even though the method of my invention renders it possible to produce such cigars at a cost that need not exceed the cost of cigars which are produced by conventional string methods and do not have tapered end portions.

Referring to FIG. 8, there is shown one form of an apparatus for practicing the method which was described in connection with FIG. 4. This apparatus comprises a frame 20 which supports a travelling endless conveyor belt 21 serving to transport a tobacco stream 9 past a tobacco removing station and past a tobacco applying station. The first of these stations accommodates a tobacco removing device 22 which comprises a revolving suction drum 24 having in its periphery a series of pockets 23, and each of these pockets is bounded by a concavo-convex bottom wall of foraminous material. The pockets 23 serve to remove from the stream 9 measured quantities of tobacco 10, and such measured quantities equal the quantities of tobacco 11 which is thereupon added to the remainder of the stream 9.

The drum 24 accommodates a stationary suction chamber 26 serving to draw a current of air through that pocket 23 which is momentarily adjacent to the exposed upper side of the stream 9 so that the pocket receives a predetermined amount of tobacco 10. The interior of the suction drum 24 further accommodates the discharge end of a nozzle 27 serving to direct blasts of compressed air against that pocket 23 which is filled with tobacco and is in registry with the intake end of an upwardly inclined duct 28 leading to a tobacco applying device 25 which is located downstream of the tobacco removing device 22. The lower wall of the duct 28 is connected with a second nozzle 29 which admits additional blasts of compressed air in order to direct tobacco into the tobacco applying device 25. As shown in FIG. 8, the suction chamber 26 terminates short of the intake end of the duct 28 to make sure that tobacco received in the right-hand pocket 23 of the suction wheel 24 may be expelled by air issuing from the nozzle 27.

The tobacco applying device 25 comprises a magazine or hopper 31 whose lower part is bounded by two inclined endless transfer belts 30 defining a chute which converges downwardly and allows measured quantities of tobacco to enter suitable peripheral pockets provided in two cooperating tobacco applying or distributing rollers 32. These rollers 32 are driven in synchronism with the belt 21 to make sure that the stream 9 will receive a uniform layer 11 of additional tobacco corresponding in quantity to tobacco 10 which was removed by the pockets 23. The belts 30 may be driven at different speeds so that they can be adjusted to deliver just as much tobacco as is necessary to form the layers 11. The resulting tobacco stream comprises portions 8 and 7 whereby the former contain more tobacco than the portions 7.

A tobacco adding device similar to the device 25 of FIG. 8 is shown in U.S. Patent No. 1,721,117 to Hopkins.

The right-hand end portion of the belt 21 carries the stream beneath an endless steel band 33 whose lower run travels in the same direction as the tobacco stream and constitutes a component part of a string forming device 34 which may be of the character disclosed, for example, in U.S. Patent No. 2,853,079 to Dupke. That portion of the stream which leaves the upper run of the belt 21 advances over a bridge member 35 and onto a tape 14 of wrapper material which is led along the upper run of a garniture belt 36. The belt 36 cooperates with a folding device 37 which convolutes the tape 14 around the string 13 to form therewith a wrapped cigar filler spring 15. This string 15 thereupon passes through a paster 38 which seals the overlapping longitudinal edge portions of the tape 14 whereby the latter forms a tube which surrounds the tobacco rod. The composition of the wrapped cigar filler string 15 is the same as shown in FIG. 5, i.e., portions 16 of greater density alternate with portions 17 of reduced density.

A cutting device 39 is placed next to the path of the wrapped string 15 and serves to sever the string at regular intervals so that the latter yields fillers 18 of requisite length. This cutting device may be of the type disclosed in U.S. Patent No. 1,914,756 to Rosler. The fillers 18 form a single file of coaxial rods which advance lengthwise through a feed 40 comprising two cooperating belts and serving to direct the fillers into a molding or compressing station 42. The latter comprises a molding drum 43 provided with a series of molding or compressing compartments 41 each of which may receive a filler 18. The drum 43 rotates about a horizontal axis which is parallel with the longitudinal direction of the wrapped string 15. Finished cigar fillers leave the compressing station 42 after advancing through an arc of nearly 360 degrees whereby each compartment 41 is evacuated in good time to receive a fresh filler during each revolution of the drum 43. The construction of molds in the drum 43 will be described in connection with FIG. 9. It suffices to say here that each mold comprises two pairs of sections 46, 47 and 48, 49 which serve to compress, in two stages, the end portions of fillers 18 whereby each such filler comprises two tapered or constricted end portions 19. The drum 43 moves the fillers 18 laterally (i.e., substantially at right angles to their axes) while the end portions of the fillers undergo compression by engagement with the mold sections 46–49.

The compressing drum 43 will be described with reference to FIGS. 8 and 9. FIG. 9 illustrates one of the compressing or molding compartments 41 and the sections of the corresponding mold are shown in positions they assume following the admission of a filler 18 by the feed 40. The filler 18 has engaged a retractable stop 44 (see FIG. 8) and rests on a ledge 45 which may be raised or lowered. The drum 43 thereupon rotates through a given angle whereby the sections 46, 47 of the corresponding mold perform a preliminary compressing or molding action to partially deform the end portions of the filler 18. In the next step (as the drum 43 rotates through another angle), the sections 46, 47 are moved away from each other to provide room for sections 48, 49 which complete the compression and deformation of the filler 18 whereby the latter resembles a cigar with two tapered or constricted end portions. Shortly before the drum 43 completes a full revolution, the sections 48, 49 are moved away from each other to release the finished product so that the latter may be ejected from the corresponding compartment 41 to be advanced on to a further processing station, not shown.

The mold section 49 is secured to and is located between two disks 50, 51 which are mounted in the drum 43. The mold section 48 is reciprocable in radially extending slots 52, 53 which are formed in the disks 50, 51 and this section 48 is provided with radially outwardly projecting extensions 54, 55. The means for reciprocating the mold section 48 toward and away from the mold section 49 comprises a pair of fixed cams 56, 57 which are adjacent to the end faces of the drum 43, and roller followers 60, 61 which track the faces of the cams 56, 57. The roller followers 60, 61 are fixed to the extensions 54, 55.

A bracket 62 carries at its inner end tubular bearings 63 having bores 64 for rods 65 which carry the ledge 45 and extend through the mold section 49. The bracket 62 is fixed to the mold section 48. Thus, when the section 48 moves radially inwardly (i.e., downwardly, as viewed in FIG. 9), the bracket 62 entrains the ledge 45 and causes this ledge to enter a recess 66 provided therefor in the internal surface of the mold section 49. Stop rings 67 serve to limit the stroke of the ledge 45 and are secured to the rods 65 in the path of the corresponding bearings 63 to thereby arrest the ledge 45 in the idle position when the ledge is retracted into the recess 66. The rods 65 engage the bearings 63 by friction so that they may slide with respect to the bracket 62 in order to compensate for differences between the strokes of the mold section 48 and ledge 45.

The lateral mold sections 46, 47 are secured to pairwise arranged levers 69, 70 which are rockable on a shaft 68, and the ends of this shaft are mounted in the disks 50, 51. Each pair of levers 69, 70 resembles a pair of tongs and their inner arms are coupled to links 75, 76 which are connected to roller followers 73. The followers 73 travel in specially configured grooves 72 of the cams 56, 57. The grooves 72 cause the mold sections 46, 47 to move toward or away from each other, depending on the momentary angular position of the drum 43.

The disks 50, 51 are mounted on a shaft 77 which is driven in synchronism with the feed 40 by a system of gears or the like, not shown. The station 43 is covered by a hood 78.

The cams 56, 57 are exchangeable so that the apparatus of FIGS. 8 and 9 may be converted for the production of differently configurated fillers. Also, it will be clear that the drum 43 accommodates a series of compartments 41 and an equal number of molds (sections 46–49) and ledges 45 to insure that the apparatus will produce a large number of fillers per unit of time.

The cam 240 shown in FIG. 8 serves to accelerate the fillers 18 and to eject them into the gap between the belts of the feed 40 whereby the fillers 18 are moved axially and away from each other to allow for intermittent rotation of the drum 43. During each internal between intermittent rotary movements of the drum 43, a compartment 41 is aligned with and may receive the foremost filler 18.

FIG. 10 illustrates a somewhat modified tobacco applying or adding device 101 which may be used in the apparatus of FIG. 8 as a substitute for the devices 22 and 25 if the apparatus is utilized for practicing the method of FIG. 3. In this embodiment of the apparatus, the upper run of the belt 21 advances a tobacco stream 4 which contains less tobacco than required in the cigar filler string. Therefore the tobacco removing device is replaced by an adjustable supply conveyor 103 which feeds tobacco into a magazine or hopper 102 corresponding substantially to the hopper 31 of FIG. 1. The hopper 102 comprises two belts 30 which feed tobacco at a controlled rate to the tobacco applying rollers 32. In addition, the device 101 comprises a control arrangement including a source 105 of light and a photoelectric impulse generator 104 which regulates the operation of the supply conveyor 103. When the mass of tobacco stored in the hopper 102 rises to a certain level, the beam of light between the source 105 and impulse generator 104 is interrupted whereby the latter sends a signal to arrest the conveyor 103 or to reduce the rate at which tobacco is being fed onto the upper run of the conveyor 103, for example, by a suitable distributor or the like in a manner not forming part of the present invention.

The stream 4 is formed in a conventional manner and the rollers 32 add thereto such quantities of tobacco as are needed to form a string 6 having portions 8 which alternate with portions 7 containing less tobacco. Once the string 6 leaves the tobacco adding station of FIG. 10 it is processed in the same way as the string 13 shown in FIG. 8. Thus, the string 6 will pass beneath the steel belt 33 and onto a tape 14 to form therewith a wrapped cigar filler string of constant cross-sectional area but with portions of greater and lesser density.

FIG. 11 illustrates a portion of a modified apparatus which may be used for carrying out a method according to which the wrapped cigar filler string is compressed ahead of the cutting device which means that the structure shown at the right-hand end of FIG. 8b may be dispensed with. The tobacco stream 4 or 9 is processed in a manner as illustrated in FIG. 8 or 10 to form a wrapped cigar filler string 15 which advances along the folding device 37, along the paster 38 and through a compressing or molding station 201 which replaces the station 42. The station 201 accommodates a first pair of compressing rolls 203 and a second pair of compressing rolls 204 (only one shown in FIG. 11). The rolls 203 have lobes 207 which compress less dense longitudinally spaced portions of the wrapped string 15 and such portions are thereupon compressed for a second time by the lobes 216 of the rolls 204. It will be noted that the rolls 203 rotate about axes which make right angles with the axes of the rolls 204. The string 15 which advances past the rolls 204 is provided with longitudinally spaced portions 19a which are of reduced cross-sectional area but are of the same density as the remainder of the string. A cutting device 202 is located downstream of the station 201 and serves to sever the string across the portions 19a so that the string yields a series of finished fillers 18a each of which comprises a pair of tapered end portions 19. The compressing device of FIG. 11 is adjustable in the longitudinal direction of the string 15 (see the double-headed arrow 201a).

Referring to FIGS. 12 to 15, the device shown at the compressing station 201 of FIG. 11 comprises two shafts 205, 206 which drive the rolls 203. These rolls are provided with peripheral grooves 209 each of which accommodates a lobe 207 removably secured to the respective roll 203 by a radial screw 213. FIGS. 12 and 13 illustrate the rolls 203 in angular positions in which the lobes 207 are located directly opposite each other and define a narrow gap 208 so as to compress the corresponding portion of the wrapped string 15. The radii of the grooves 209 correspond to the radius of the string 15 and the flanges 210 of the rolls 203 are in rolling contact with each other so that the string 15 is fully enclosed at the time it passes through the gap 208. The shafts 205, 206 are driven by mating gears 211, 212 which are rotated from the main drive shaft of the machine, not shown, to rotate the rolls 203 at a peripheral speed corresponding to the speed of the wrapped string 15.

The lobes 207 may be removed to be replaced by differently configurated or dimensioned lobes if the apparatus is to produce fillers with differently configurated end portions 19.

FIGS. 14 and 15 show that the rolls 204 of the second pair are mounted on parallel shafts 214, 215 which are driven by mating gears 220, 221. The rolls 204 are also provided with peripheral grooves 218 whose radii equal the radius of the string 15. The grooves are disposed between flanges 219 which roll along each other when the gears 220, 221 are driven to rotate the rolls 204 at a peripheral speed which equals the forward speed of the wrapped string 15. The lobes 216 are detachably fixed in the bottom portions of the grooves 218 and are held by screws 222. These lobes 216 define between themselves a gap 217 of circular outline, and the precompressed portions of the wrapped string 15 must pass through this gap to insure that the string is formed with portions 19a which are thereupon severed by the cutting device 202. It will be noted that FIGS. 14 and 15 show the lobes 216 in positions in which they are immediately adjacent to each other. The cutouts in the tips of the lobes 216 then define the aforementioned passage or gap 217. The circumferential length of the rolls 203 and 204 will determine the length of the fillers 19a. The screws 222 enable an operator to replace the lobes 216 by a set of differently configurated and/or dimensioned lobes.

It will be readily understood that all moving parts of the apparatus shown in FIGS. 8–9, 10 or 11–15 may be driven from a main shaft in a manner as is customary in many types of tobacco processing machines, and that the drive for such moving parts comprises various transmissions, control devices and other elements necessary to insure that the parts will be operated in synchronism as regards the timing, duration and/or speed of various operations.

FIG. 16a illustrates a wrapped continuous cigar filler string 300 having first portions 301 of greater density alternating with second portions 302 of lesser density. The distance between the centers of portions 302 equals the length of a filler 303 of double unit length, see FIG. 16d. The portions 302 of lesser density are then compressed, as shown at 304 in FIG. 16b, to transform the string 301 into a string 305 wherein portions 307 of constant cross section alternate with portions 306 of varying cross section. The string 305 is thereupon severed in planes indicated by the phantom lines 308, shown in FIG. 16c to yield fillers 303 of double unit length. In a further step, each filler 303 is severed in a plane indicated by the phantom line 309, shown in FIG. 16d, to yield two fillers 310 of unit length. FIG. 16e shows that each filler 310 comprises a constricted end portion 311 and an end portion 312 of constant cross section.

FIG. 17a illustrates a string 300 which is identical with the string shown in FIG. 16a. This string is then severed midway across the portions 302 of lesser density in planes indicated by phantom lines 315, see FIG. 17b, to yield fillers 316 of double unit length. As shown in FIGS. 17b and 17c, the cross section of each filler 316 is constant from end to end but each of its end portions 317 contains less tobacco than the intermediate portion 318. Such end portions 317 are thereupon compressed to form tapered or constricted end portions 319 shown in FIG. 17d, and the resulting filler 320 of double unit length is severed in a plane indicated by the phantom line 321 (see FIG. 17e) to yield two fillers 322 of unit length shown in FIG. 17f. It will be seen that each filler comprises a tapered end portion 319 and an end portion 323 of constant cross section.

Without further analysis, the foregoing will so fully reveal the gist of the present invention that others can, by applying current knowledge, readily adapt it for various applications without omitting features which fairly constitute essential characteristics of the generic and specific aspects of the present invention and, therefore, such adaptations should and are intended to be comprehended within the meaning and range of equivalence of the following claims.

What is claimed as new and desired to be secured by Letters Patent is:

1. In a method of producing cigar fillers with constricted end portions, the step of forming a continuous cigar filler string having first portions of greater density which alternate with second portions of lesser density, and the additional steps of compressing said second portions and severing said string across said second portions, one of said additional steps preceding the other additional step.

2. In a method of producing cigar fillers with constricted end portions, the step of forming a continuous cigar filler string having first portions of greater density which alternate with second portions of lesser density, and the additional steps of compressing the second portions to substantially the same density as that of the first portions and severing the string across said second portions, one of said additional steps preceding the other additional step.

3. In a method of producing cigar fillers with constricted end portions, the steps of forming a continuous tobacco stream of substantially constant cross-sectional area and density along its length, supplying additional quantities of tobacco to longitudinally spaced portions of said stream and compressing said longitudinally spaced portions of the stream to form a cigar filler string of substantially constant cross-sectional area whereby the string comprises compressed first portions of greater density which alternate with second portions of lesser density, and the additional steps of compressing said second portions to substantially the same density as that of said first portions and severing the string across said second portions, one of said additional steps preceding the other additional step.

4. In a method of producing cigar fillers with constricted end portions, the steps of forming a continuous tobacco stream of substantially constant cross-sectional area and density along its length, removing a predetermined quantity of tobacco from each of a plurality of longitudinally spaced portions of said stream, adding the thus removed tobacco to the remaining portions of the stream and compressing the stream to form a cigar filler string of substantially constant cross-section whereby said string comprises first portions of greater density which alternate with second portions of lesser density, and the additional steps of compressing said second portions to substantially the same density as that of said first portions and severing said string across said second portions, one of said additional steps preceding the other additional step.

5. In a method of producing cigar fillers with constricted end portions, the step of forming a wrapped continuous cigar filler string having first portions of greater density which alternate with second portions of lesser density, and the additional steps of compressing said second portions and severing said string across said second portions, one of said additional steps preceding the other additional step.

6. In a method of producing cigar fillers with constricted end portions, the steps of forming a continuous cigar filler string of constant cross-sectional area and having first portions of greater density which alternate with second portions of lesser density and convoluting a wrapper around said string to form a wrapped cigar filler string, and the additional steps of compressing the second portions to substantially the same density as that of the first portions and severing the wrapped string across said second portions, one of said additional steps preceding the other additional step.

7. In a method of producing cigar fillers with constricted end portions, the steps of forming a continuous tobacco stream of substantially constant cross-sectional area and density along its length, supplying additional quantities of tobacco to longitudinally spaced portions of said stream, compressing said longitudinally spaced portions of the stream to form a cigar filler string of substantially constant cross-sectional area whereby the string comprises compressed first portions of greater density which alternate with second portions of lesser density and convoluting a wrapper around said string to form a wrapped cigar filler string, and the additional steps of compressing said second portions to substantially the same density as that of said first portions and severing the wrapped string across said second portions, one of said additional steps preceding the other additional step.

8. In a method of producing cigar fillers with constricted end portions, the steps of forming a continuous tobacco stream of substantially constant cross-sectional area and density along its length, removing a predetermined quantity of tobacco from each of a plurality of longitudinally spaced portions of said stream, adding the thus removed tobacco to the remaining portions of the stream, compressing the stream to form a cigar filler string of substantially constant cross-section whereby said string comprises first portions of greater density which alternate with second portions of lesser density and convoluting a wrapper around said string to form a wrapped cigar filler string and the additional steps of compressing said second portions to substantially the same density as that of said first portions and severing said wrapped string across said second portions, one of said additional steps preceding the other additional step.

9. In a method of producing cigar fillers with constricted end portions, the steps of forming a wrapped continuous cigar filler string having first portions of greater density which alternate with second portions of lesser density, compressing the second portions to substantially the same density as that of the first portions, and severing the wrapped string across the thus compressed second portions.

10. In a method of producing cigar fillers with constricted end portions, the steps of forming a wrapped continuous cigar filler string having first portions of greater density which alternate with second portions of lesser density, severing the wrapped string across said second portions to form fillers each of which comprises a median portion of greater density and two end portions of lesser density, and compressing the end portions of said fillers to substantially the same density as that of said median portions.

11. In a method as set forth in claim 10, the step of moving said fillers laterally while the end portions of said fillers undergo compression.

12. In a method of producing cigar fillers with constricted end portions, the step of forming a continuous cigar filler string having first portions of greater density which alternate with second portions of lesser density, and the additional steps of compressing said second portions in a plurality of stages and severing said string across said second portions, one of said additional steps preceding the other additional step.

13. In a method of producing cigar fillers with constricted end portions, the steps of forming a continuous tobacco stream of substantially constant cross-sectional area and density along its length, removing a predetermined quantity of tobacco from each of a plurality of longitudinally spaced portions of said stream, adding the thus removed tobacco evenly to the remaining portions of the stream, compressing the stream to form a cigar filler string of substantially constant cross-section whereby said string comprises first portions of greater density which alternate with second portions of lesser density and simultaneously convoluting a wrapper around said string to form a wrapped cigar filler string, compressing said second portions to substantially the same density as that of said first portions, and severing said string across said second portions.

14. In a method of producing cigar fillers with constricted end portions, the steps of forming a continuous tobacco stream of substantially constant cross-sectional area and density along its length, removing a predetermined quantity of tobacco from each of a plurality of longitudinally spaced portions of said stream, adding the thus removed tobacco evenly to the remaining portions of the stream, compressing the stream to form a cigar filler string of substantially constant cross-section whereby said string comprises first portions of greater density which alternate with second portions of lesser density and simultaneously convoluting a wrapper around said string to form a wrapped cigar filler string, severing the wrapped string across said second portions to form fillers having median portions of greater density and end portions of lesser density, and compressing the end portions of said fillers.

15. In a method of producing cigar fillers with constricted end portions, the steps of forming a continuous tobacco stream of substantially constant cross-sectional area and density along its length, supplying additional quantities of tobacco to longitudinally spaced portions of said stream and distributing such additional tobacco evenly along the corresponding portions of the stream, compressing said longitudinally spaced portions of the stream to form a cigar filler string of substantially constant cross-sectional area whereby the string comprises compressed first portions of greater density which alternate with second portions of lesser density and simultaneously convoluting a wrapper around said string to form a wrapped cigar filler string, severing the wrapped string across said second portions to form fillers having median portions of greater density and end portions of lesser density, and compressing the end portions of said fillers.

16. In a method of producing cigar fillers with constricted end portions, the step of forming a wrapped continuous cigar filler string having longer first portions of greater density which alternate with shorter second portions of lesser density, and the additional steps of compressing said second portions and severing said string across said second portions, one of said additional steps preceding the other additional step.

17. In a method of producing cigar fillers of double unit length with constricted end portions, the step of forming a wrapped continuous cigar filler string having first portions of greater density alternating with second portions of lesser density whereby the distance between the centers of said second portions equals the length of a filler of double unit length, and the additional steps of compressing said second portions and severing the wrapped string across the centers of said second portions whereby said wrapped string yields fillers of double unit length with a constricted end portion at each end of each filler, one of said additional steps preceding the other additional step.

18. In a method as set forth in claim 17, the further step of severing each filler midway between its end portions to form fillers of unit length.

19. In a method of producing cigar fillers having constricted end portions, the steps of forming a continuous tobacco stream of substantially constant cross-sectional area and density, removing a quantity of tobacco from each of a plurality of longitudinally spaced portions of said stream, adding each of said removed quantities of tobacco to an adjacent portion from which no tobacco has been removed, compressing the portions to which tobacco has been added to a greater density than that of the portions from which tobacco has been removed to form a cigar filler string, severing the string in the ranges of such sections from which tobacco has been removed to form fillers with end portions of lesser density, and compressing the end portions of said fillers to substantially the same density as that of the remainder of the fillers to form fillers of substantially constant density and with constricted end portions.

References Cited by the Examiner

UNITED STATES PATENTS

| | | | |
|---|---|---|---|
| 128,560 | 7/1872 | Pease | 131—65 X |
| 739,278 | 9/1903 | Anderson | 131—83 |
| 1,721,117 | 7/1929 | Hopkins | 131—65 |
| 1,944,760 | 1/1934 | Rundell | 131—87 X |
| 1,977,994 | 10/1934 | Lindblad | 131—81 X |
| 2,111,672 | 3/1938 | Molins | |
| 2,232,832 | 2/1941 | Walborn | |
| 2,367,911 | 1/1945 | Wells | 131—61 X |
| 2,954,773 | 10/1960 | Lebert | 131—10 |

FOREIGN PATENTS 650,879 10/1937 Germany.

SAMUEL KOREN, *Primary Examiner.*